(12) United States Patent
Liang et al.

(10) Patent No.: US 8,743,324 B2
(45) Date of Patent: Jun. 3, 2014

(54) DISPLAY APPARATUS

(75) Inventors: Kuang-Heng Liang, Hsinchu (TW);
Jia-Hung Chen, Hsinchu (TW);
Shuan-Shen Yang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 78 days.

(21) Appl. No.: 13/615,648

(22) Filed: Sep. 14, 2012

(65) Prior Publication Data

US 2014/0034975 A1     Feb. 6, 2014

(30) Foreign Application Priority Data

Aug. 6, 2012 (TW) .............................. 101128280 A

(51) Int. Cl.
*G02F 1/1335* (2006.01)

(52) U.S. Cl.
USPC ..... 349/110; 349/104; 349/111; 257/E33.067

(58) Field of Classification Search
USPC ...................... 257/13, 40, 43, 49–75, 79–103, 257/E33.067, E33.068, E33.07; 438/22–47, 438/99, 104; 313/498–512; 345/87–104; 349/104–115; 430/7, 321
See application file for complete search history.

(56) References Cited

U.S. PATENT DOCUMENTS

| | | | | |
|---|---|---|---|---|
| 6,157,426 A * | 12/2000 | Gu | ................................ | 349/111 |
| 6,912,020 B2 * | 6/2005 | Kawata | ........................... | 349/44 |
| 7,167,221 B2 * | 1/2007 | Yeh et al. | ...................... | 349/110 |
| 7,297,981 B2 * | 11/2007 | Shimizu et al. | ................. | 257/72 |
| 7,388,632 B2 * | 6/2008 | Kim | ................................ | 349/110 |
| 7,528,917 B2 * | 5/2009 | Kim et al. | ..................... | 349/141 |

* cited by examiner

*Primary Examiner* — Matthew Landau
*Assistant Examiner* — Eric Ward
(74) *Attorney, Agent, or Firm* — Jianq Chyun IP Office

(57) ABSTRACT

A display apparatus includes an active device array substrate, an opposite substrate disposed opposite to the active device array substrate, and a display medium disposed between the active device array substrate and the opposite substrate. The opposite substrate includes a first base and a light-shielding structure disposed on the first base and located between the first base and the active device array substrate. The light-shielding structure has a first dielectric layer, a second dielectric layer, a third dielectric layer, a metal layer, a fourth dielectric layer, a fifth dielectric layer, and a sixth dielectric layer stacked sequentially in a direction from the first base to the active device array substrate. The first, second, and third dielectric layers have different thicknesses. The fourth, fifth, and sixth dielectric layers have different thicknesses.

17 Claims, 1 Drawing Sheet

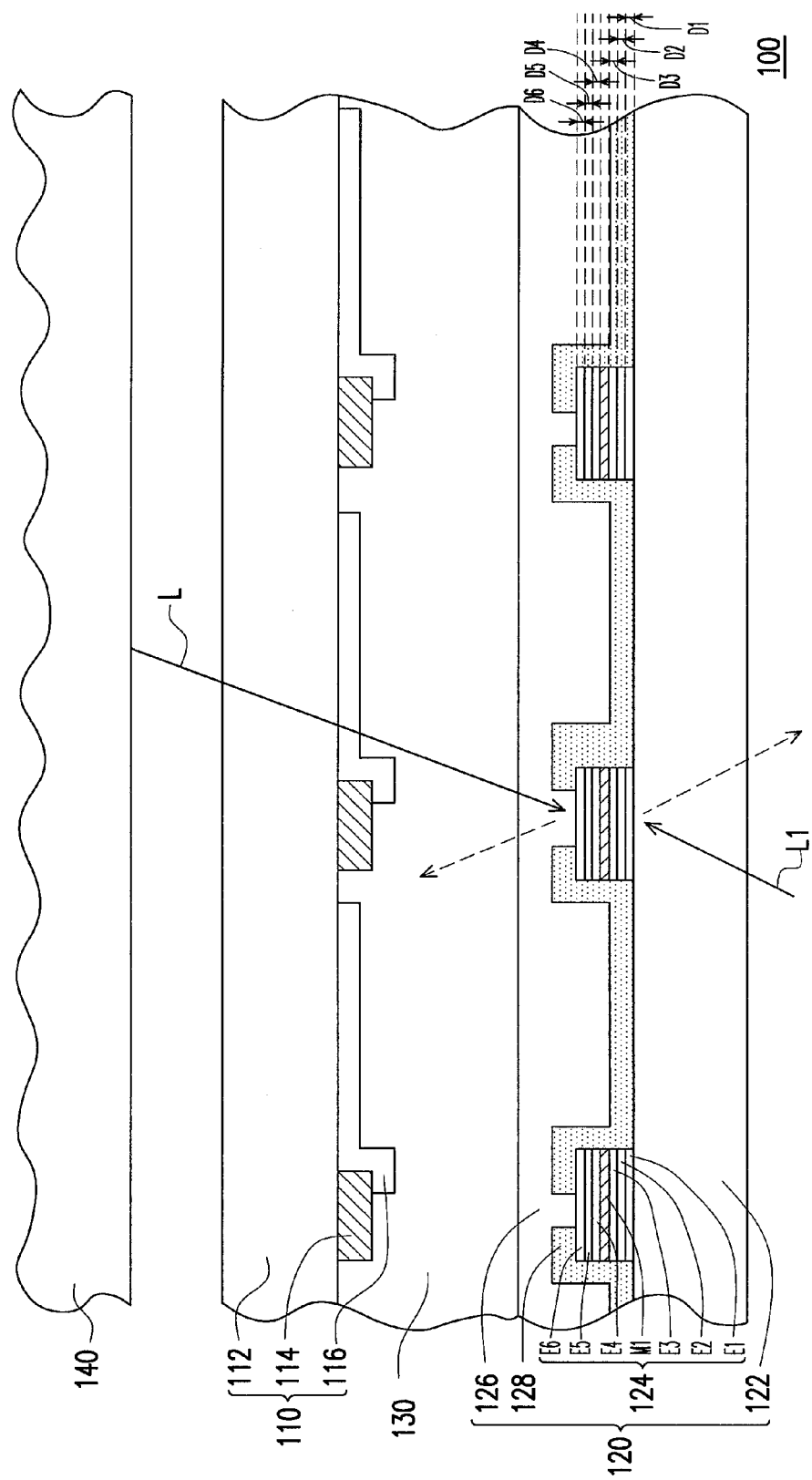

DISPLAY APPARATUS

CROSS-REFERENCE TO RELATED APPLICATION

This application claims the priority benefit of Taiwan application serial no. 101128280, filed on Aug. 6, 2012. The entirety of the above-mentioned patent application is hereby incorporated by reference herein and made a part of this specification.

BACKGROUND OF THE INVENTION

1. Field of the Invention

The invention relates to a display apparatus, and more particularly, to a display apparatus that includes a light-shielding structure.

2. Descriptions of the Related Art

As environmental concerns rise, flat display apparatuses that are characterized by low power consumption, favorable space utilization, absence of radiation, and high resolution have held the dominating position in the market. At present, the most common types of flat display apparatuses include liquid crystal displays (LCD), plasma displays, organic electroluminescent displays (OELD), and so forth.

Among these displays, the most popular LCD is, for instance, constituted by an LCD panel and a backlight source disposed besides the LCD panel. The LCD panel includes an active device array substrate, a color filter substrate, and a liquid crystal layer disposed between the two substrates. In a conventional color filter substrate, a light-shielding structure is often made of metal or resin. Nonetheless, when the light-shielding layer simply made of metal is applied to products with high brightness, the light-shielding layer may reflect light emitted by the backlight source to active devices of the active device array substrate, such that the active devices may encounter an issue of photo-induced leakage current. Thereby, cross talk or image sticking may occur in the LCD, and the LCD may not be able to perform the display function normally. From another aspect, the light-shielding structure simply made of resin is not apt to reflect the light emitted by the backlight source to the active devices, whereas the adhesion between the resin light-shielding structure and the base of the color filter substrate is unfavorable, which frequently leads to quality issues.

SUMMARY OF THE INVENTION

The invention is directed to a display apparatus that achieves satisfactory display effects and has favorable display quality.

In an embodiment of the invention, a display apparatus that includes an active device array substrate, an opposite substrate disposed opposite to the active device array substrate, and a display medium disposed between the active device array substrate and the opposite substrate is provided. The opposite substrate includes a first base and a light-shielding structure disposed on the first base and located between the first base and the active device array substrate. The light-shielding structure has a first dielectric layer, a second dielectric layer, a third dielectric layer, a metal layer, a fourth dielectric layer, a fifth dielectric layer, and a sixth dielectric layer stacked sequentially in a direction from the first base to the active device array substrate. A thickness of the first dielectric layer, a thickness of the second dielectric layer, and a thickness of the third dielectric layer are different from one other. A thickness of the fourth dielectric layer, a thickness of the fifth dielectric layer, and a thickness of the sixth dielectric layer are different from one other.

According to an embodiment of the invention, a refractive index of the first dielectric layer and a refractive index of the third dielectric layer are the same, and a refractive index of the second dielectric layer is different from the refractive index of the first dielectric layer and the refractive index of the third dielectric layer.

According to an embodiment of the invention, each of the refractive index of the first dielectric layer and the refractive index of the third dielectric layer is smaller than the refractive index of the second dielectric layer.

According to an embodiment of the invention, each of the refractive index of the first dielectric layer and the refractive index of the third dielectric layer is greater than the refractive index of the second dielectric layer.

According to an embodiment of the invention, the thickness of the first dielectric layer is D1, the thickness of the second dielectric layer is D2, the thickness of the third dielectric layer is D3, D1 ranges from 100 angstroms (Å) to 500 Å, D2 ranges from 500 Å to 1000 Å, and D3 ranges from 800 Å to 1200 Å.

According to an embodiment of the invention, a refractive index of the fourth dielectric layer and a refractive index of the sixth dielectric layer are the same, and a refractive index of the fifth dielectric layer is different from the refractive index of the fourth dielectric layer and the refractive index of the sixth dielectric layer.

According to an embodiment of the invention, each of the refractive index of the fourth dielectric layer and the refractive index of the sixth dielectric layer is smaller than the refractive index of the fifth dielectric layer.

According to an embodiment of the invention, each of the refractive index of the fourth dielectric layer and the refractive index of the sixth dielectric layer is greater than the refractive index of the fifth dielectric layer.

According to an embodiment of the invention, the thickness of the fourth dielectric layer is D4, the thickness of the fifth dielectric layer is D5, the thickness of the sixth dielectric layer is D6, D6 ranges from 100 angstroms (Å) to 500 Å, D5 ranges from 500 Å to 1000 Å, and D4 ranges from 800 Å to 1200 Å.

According to an embodiment of the invention, the first dielectric layer, the second dielectric layer, and the third dielectric layer are mirror symmetrical to the sixth dielectric layer, the fifth dielectric layer, and the fourth dielectric layer with respect to the metal layer as a mirror surface.

According to an embodiment of the invention, a refractive index and the thickness of the first dielectric layer are identical to a refractive index and the thickness of the sixth dielectric layer, a refractive index and the thickness of the second dielectric layer are identical to a refractive index and the thickness of the fifth dielectric layer, and a refractive index and the thickness of the third dielectric layer are identical to a refractive index and the thickness of the fourth dielectric layer.

According to an embodiment of the invention, the active device array substrate includes a second base, a plurality of active devices, and a plurality of pixel electrodes. The active devices and the pixel electrodes are arranged in arrays on the second base and located between the second base and the display medium. The active devices are electrically connected to the pixel electrodes. The light-shielding structure covers the active devices but exposes the pixel electrodes.

According to an embodiment of the invention, the opposite substrate further includes a common electrode layer. The common electrode layer is disposed between the display medium and the light-shielding structure.

According to an embodiment of the invention, the opposite substrate further includes a color filter layer. The color filter layer is disposed between the display medium and the light-shielding structure and between the display medium and the first base.

According to an embodiment of the invention, the display apparatus further includes a backlight source. The backlight source is disposed besides the active device array substrate and adapted for emitting a light beam. The light beam is transmitted from the active device array substrate to the opposite substrate.

According to an embodiment of the invention, a material of the metal layer is opaque metal.

According to an embodiment of the invention, a reflective index of the light-shielding structure with respect to a visible light wavelength of the light beam is smaller than 5%.

In view of the foregoing, the display apparatus has the light-shielding structure with multiple film layers, and the light-shielding structure described herein may replace the conventional light-shielding structure for covering the non-display region. Furthermore, the amount of the light beam which is emitted from the backlight source and reflected back to the active devices may be reduced. As such, current leakage caused by irradiation from the backlight source and an external light source is not prone to occur in the active devices, and the abnormal display issues, e.g., cross talk, image sticking, etc, are not apt to occur in the display apparatus.

Several exemplary embodiments accompanied with figures are described in detail below to further explain the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 1 is a schematic cross-sectional view illustrating a display apparatus according to an embodiment of the invention.

DETAILED DESCRIPTION OF DISCLOSED EXEMPLARY EMBODIMENTS

FIG. 1 is a schematic cross-sectional view illustrating a display apparatus according to an embodiment of the invention. With reference to FIG. 1, the display apparatus 100 described in the present embodiment includes an active device array substrate 110, an opposite substrate 120 disposed opposite to the active device array substrate 110, and a display medium 130 disposed between the active device array substrate 110 and the opposite substrate 120. In the present embodiment, the display medium 130 may be a non-self-illuminating material, e.g., liquid crystal or any other appropriate material, which should not be construed as a limitation to the invention.

The active device array substrate 110 described herein includes a second base 112, a plurality of active devices 114, and a plurality of pixel electrodes 116. The active devices 114 and the pixel electrodes 116 are arranged in arrays on the second base 112 and located between the second base 112 and the display medium 130. Besides, the active devices 114 are electrically connected to the pixel electrodes 116. According to the present embodiment, the active devices 114 may be thin film transistors, and the pixel electrodes 116 may be transparent conductive patterns, for instance. Each of the active devices 114 has a source, a gate, and a drain (not shown). The pixel electrodes 116 are electrically connected to the drains (not shown) of the active devices 114. In the present embodiment, the active device array substrate 110 further includes a plurality of data lines (not shown) and a plurality of scan lines (not shown) disposed on the second base 112. The data lines intersect the scan lines. Here, the data lines are electrically connected to the sources (not shown) of the active devices 114, and the scan lines are electrically connected to the gates (not shown) of the active devices 114.

The opposite substrate 120 described in the present embodiment includes a first base 122 and a light-shielding structure 124 disposed on the first base 122 and located between the first base 122 and the active device array substrate 110. A material of the first base 122 (and the second base 112) may be glass, quartz, organic polymer, or any other appropriate material. The light-shielding structure 124 covers the active devices 114 but exposes the pixel electrodes 116. Moreover, the light-shielding structure 124 may cover the data lines and the scan lines of the active device array substrate 110. In the present embodiment, the opposite substrate 120 further includes a common electrode layer 126 disposed between the display medium 130 and the light-shielding structure 124. The common electrode layer 126 covers the light-shielding structure 124 and the first base 122. Here, the common electrode layer 126 is, for instance, a transparent conductive layer. Alternatively, the opposite substrate 120 described in the present embodiment may include a color filter layer 128. The color filter layer 128 may be disposed between the display medium 130 and the light-shielding structure 124 and between the display medium 130 and the first base 122.

In the present embodiment, the display apparatus 100 further includes a backlight source 140. The backlight source 140 is disposed besides the active device array substrate 110 and adapted for emitting a light beam L. The light beam L is transmitted from the active device array substrate 110 to the opposite substrate 120. Note that the light-shielding structure 124 described in the present embodiment not only can act as the conventional light-shielding structure (e.g., a black matrix, BM) for covering the non-display region but also can reduce the amount of the light beam L emitted from the backlight source 140 and reflected by the light-shielding structure 124 back to the active devices 114. As such, current leakage caused by irradiation from the backlight source and the external light source is not prone to occur in the active devices 114 described herein, and the abnormal display issues, e.g., cross talk, image sticking, etc, are not apt to occur in the display apparatus 100.

Due to the interference of multiple film layers, the light-shielding structure 124 described in the present embodiment may reduce both the amount of the light beam L emitted from the backlight source 140 and reflected back to the active devices 114 and the amount of an external light beam L1 reflected by the light-shielding structure 124. As to the light beam L transmitted from the active device array substrate 110 to the light-shielding structure 124, a reflective index of the light-shielding structure 124 with respect to a visible light wavelength of the light beam L may be smaller than 5% in the present embodiment. As to the light beam L1 transmitted from the first base 122 of the opposite substrate 120 to the light-shielding structure 124, a reflective index of the light-shielding structure 124 with respect to a visible light wavelength of the light beam L1 may be smaller than 5% as well.

The light-shielding structure 124 described in the present embodiment has a first dielectric layer E1, a second dielectric layer E2, a third dielectric layer E3, a metal layer M1, a fourth dielectric layer E4, a fifth dielectric layer E5, and a sixth dielectric layer E6 stacked sequentially in a direction from the first base 122 to the active device array substrate 110. A thickness of the first dielectric layer E1, a thickness of the second dielectric layer E2, and a thickness of the third dielectric layer E3 are different from one other. A thickness of the fourth dielectric layer E4, a thickness of the fifth dielectric layer E5, and a thickness of the sixth dielectric layer E6 are different from one other.

According to the present embodiment, a refractive index of the first dielectric layer E1 and a refractive index of the third dielectric layer E3 may be the same, and a refractive index of the second dielectric layer E2 may be different from the refractive index of the first dielectric layer E1 and the refractive index of the third dielectric layer E3. To be specific, each of the refractive index of the first dielectric layer E1 and the refractive index of the third dielectric layer E3 may be smaller than the refractive index of the second dielectric layer E2. In the present embodiment, the first dielectric layer E1 and the third dielectric layer E3 may be made of silicon oxide ($Si_xO$) with a relatively small refractive index, and the second dielectric layer E2 may be made of silicon nitride ($Si_xN$) with a relatively large refractive index, for instance. Besides, the metal layer M1 may be made of opaque metal, e.g., chromium (Cr), which should however not be construed as a limitation to the invention.

In another embodiment of the invention, each of the refractive index of the first dielectric layer E1 and the refractive index of the third dielectric layer E3 may be greater than the refractive index of the second dielectric layer E2. The first dielectric layer E1 and the third dielectric layer E3 may be made of $Si_xN$ with a relatively large refractive index, and the second dielectric layer E2 may be made of $Si_xO$ with a relatively small refractive index, for instance. Note that the first dielectric layer E1, the second dielectric layer E2, the third dielectric layer E3, and the metal layer M1 may be made of other materials in addition to the above-mentioned materials, and the materials of the first dielectric layer E1, the second dielectric layer E2, and the third dielectric layer E3 in another embodiment may be selected from other common dielectric materials applicable in a process of manufacturing a display panel.

In the present embodiment, a thickness of the first dielectric layer E1 is D1, a thickness of the second dielectric layer E2 is D2, and a thickness of the third dielectric layer E3 is D3. The thickness D3 of the third dielectric layer E3 may be greater than the thickness D2 of the second dielectric layer E2. The thickness D2 of the second dielectric layer E2 may be greater than the thickness D1 of the first dielectric layer E1. According to an embodiment of the invention, the thickness D1 of the first dielectric layer E1 may range from 100 Å to 500 Å, the thickness D2 of the second dielectric layer E2 may range from 500 Å to 1000 Å, and the thickness D3 of the third dielectric layer E3 may range from 800 Å to 1200 Å. The thickness of the metal layer M1 may range from 1000 Å to 2000 Å.

According to the present embodiment, a refractive index of the fourth dielectric layer E4 and a refractive index of the sixth dielectric layer E6 may be the same, and a refractive index of the fifth dielectric layer E5 may be different from the refractive index of the fourth dielectric layer E4 and the refractive index of the sixth dielectric layer E6. In particular, each of the refractive index of the fourth dielectric layer E4 and the refractive index of the sixth dielectric layer E6 may be smaller than the refractive index of the fifth dielectric layer E5 in the present embodiment. The fourth dielectric layer E4 and the sixth dielectric layer E6 may be made of $Si_xO$ with a relatively small refractive index, and the fifth dielectric layer E5 may be made of $Si_xN$ with a relatively large refractive index, for instance.

However, the invention is not limited thereto, and each of the refractive index of the fourth dielectric layer E4 and the refractive index of the sixth dielectric layer E6 may be greater than the refractive index of the fifth dielectric layer E5 in another embodiment of the invention. The fourth dielectric layer E4 and the sixth dielectric layer E6 may be made of $Si_xN$ with a relatively large refractive index, and the fifth dielectric layer E5 may be made of $Si_xO$ with a relatively small refractive index, for instance. Note that the fourth dielectric layer E4, the fifth dielectric layer E5, and the sixth dielectric layer E6 may be made of other materials in addition to the above-mentioned materials, and the materials of the fourth dielectric layer E4, the fifth dielectric layer E5, and the sixth dielectric layer E6 in another embodiment may be selected from other common dielectric materials applicable in a process of manufacturing a display panel.

In the present embodiment, a thickness of the fourth dielectric layer E4 is D4, a thickness of the fifth dielectric layer E5 is D5, and a thickness of the sixth dielectric layer E6 is D6. The thickness D4 of the fourth dielectric layer E4 may be greater than the thickness D5 of the fifth dielectric layer E5. The thickness D5 of the fifth dielectric layer E5 may be greater than the thickness D6 of the sixth dielectric layer E6. For instance, the thickness D6 of the sixth dielectric layer E6 may range from 100 Å to 500 Å, the thickness D5 of the fifth dielectric layer E5 may range from 500 Å to 1000 Å, and the thickness D4 of the fourth dielectric layer E4 may range from 800 Å to 1200 Å.

According to an embodiment of the invention, the first dielectric layer E1, the second dielectric layer E2, and the third dielectric layer E3 are mirror symmetrical to the sixth dielectric layer E6, the fifth dielectric layer E5, and the fourth dielectric layer E4 with respect to the metal layer M1 as a mirror surface. In other words, the refractive index and the thickness of the first dielectric layer E1 may be the same as those of the sixth dielectric layer E6; the refractive index and the thickness of the second dielectric layer E2 may be the same as those of the fifth dielectric layer E5; the refractive index and the thickness of the third dielectric layer E3 may be the same as those of the fourth dielectric layer E4.

To sum up, the display apparatus described in an embodiment of the invention has the light-shielding structure with multiple film layers, and the light-shielding structure herein may replace the conventional light-shielding structure for covering the non-display region. Furthermore, the amount of the light beam which is emitted from the backlight source and reflected back to the active devices may be reduced. As such, current leakage caused by irradiation from the backlight source and an external light source is not prone to occur in the active devices, and the abnormal display issues, e.g., cross talk, image sticking, etc, are not apt to occur in the display apparatus.

From another perspective, in the light-shielding structure of the display apparatus described in an embodiment of the invention, the dielectric layers are connected to the first base. Owing to the favorable adhesion between the dielectric layers and the first base, the light-shielding structure is not apt to be separated from the first base, which may further resolve the quality issue that arises from unsatisfactory adhesion between the conventional light-shielding structure and the base.

It will be apparent to those skilled in the art that various modifications and variations can be made to the structure of the disclosed embodiments without departing from the scope or spirit of the invention. In view of the foregoing, it is intended that the invention covers modifications and variations of this invention provided they fall within the scope of the following claims and their equivalents.

What is claimed is:

1. A display apparatus comprising:
an active device array substrate;
an opposite substrate disposed opposite to the active device array substrate, the opposite substrate comprising:
a first base; and
a light-shielding structure disposed on the first base and located between the first base and the active device array substrate, the light-shielding structure having a first dielectric layer, a second dielectric layer, a third dielectric layer, a metal layer, a fourth dielectric layer, a fifth dielectric layer, and a sixth dielectric layer stacked sequentially in a direction from the first base to the active device array substrate, wherein a thickness of the first dielectric layer, a thickness of the second dielectric layer, and a thickness of the third dielectric layer are different from one another, and a thickness of the fourth dielectric layer, a thickness of the fifth dielectric layer, and a thickness of the sixth dielectric layer are different from one another; and
a display medium disposed between the active device array substrate and the opposite substrate.

2. The display apparatus as recited in claim 1, wherein a refractive index of the first dielectric layer and a refractive index of the third dielectric layer are the same, and a refractive index of the second dielectric layer is different from the refractive index of the first dielectric layer and the refractive index of the third dielectric layer.

3. The display apparatus as recited in claim 2, wherein each of the refractive index of the first dielectric layer and the refractive index of the third dielectric layer is smaller than the refractive index of the second dielectric layer.

4. The display apparatus as recited in claim 2, wherein each of the refractive index of the first dielectric layer and the refractive index of the third dielectric layer is greater than the refractive index of the second dielectric layer.

5. The display apparatus as recited in claim 1, wherein the thickness of the first dielectric layer is D1, the thickness of the second dielectric layer is D2, the thickness of the third dielectric layer is D3, D1 ranges from 100 angstroms to 500 angstroms, D2 ranges from 500 angstroms to 1000 angstroms, and D3 ranges from 800 angstroms to 1200 angstroms.

6. The display apparatus as recited in claim 1, wherein a refractive index of the fourth dielectric layer and a refractive index of the sixth dielectric layer are the same, and a refractive index of the fifth dielectric layer is different from the refractive index of the fourth dielectric layer and the refractive index of the sixth dielectric layer.

7. The display apparatus as recited in claim 6, wherein each of the refractive index of the fourth dielectric layer and the refractive index of the sixth dielectric layer is smaller than the refractive index of the fifth dielectric layer.

8. The display apparatus as recited in claim 6, wherein each of the refractive index of the fourth dielectric layer and the refractive index of the sixth dielectric layer is greater than the refractive index of the fifth dielectric layer.

9. The display apparatus as recited in claim 1, wherein the thickness of the fourth dielectric layer is D4, the thickness of the fifth dielectric layer is D5, the thickness of the sixth dielectric layer is D6, D6 ranges from 100 angstroms to 500 angstroms, D5 ranges from 500 angstroms to 1000 angstroms, and D4 ranges from 800 angstroms to 1200 angstroms.

10. The display apparatus as recited in claim 1, wherein the first dielectric layer, the second dielectric layer, and the third dielectric layer are mirror symmetrical to the sixth dielectric layer, the fifth dielectric layer, and the fourth dielectric layer with respect to the metal layer as a mirror surface.

11. The display apparatus as recited in claim 1, wherein a refractive index and the thickness of the first dielectric layer are identical to a refractive index and the thickness of the sixth dielectric layer, a refractive index and the thickness of the second dielectric layer are identical to a refractive index and the thickness of the fifth dielectric layer, and a refractive index and the thickness of the third dielectric layer are identical to a refractive index and the thickness of the fourth dielectric layer.

12. The display apparatus as recited in claim 1, wherein the active device array substrate comprises a second base, a plurality of active devices, and a plurality of pixel electrodes, the active devices and the pixel electrodes are arranged in arrays on the second base and located between the second base and the display medium, the active devices are electrically connected to the pixel electrodes, and the light-shielding structure covers the active devices but exposes the pixel electrodes.

13. The display apparatus as recited in claim 1, wherein the opposite substrate further comprises a common electrode layer disposed between the display medium and the light-shielding structure.

14. The display apparatus as recited in claim 1, wherein the opposite substrate further comprises a color filter layer disposed between the display medium and the light-shielding structure and between the display medium and the first base.

15. The display apparatus as recited in claim 1, further comprising a backlight source disposed besides the active device array substrate and adapted for emitting a light beam, wherein the light beam is transmitted from the active device array substrate to the opposite substrate.

16. The display apparatus as recited in claim 1, wherein a material of the metal layer is opaque metal.

17. The display apparatus as recited in claim 15, wherein a reflective index of the light-shielding structure with respect to a visible light wavelength of the light beam is smaller than 5%.

* * * * *